Figure 3:
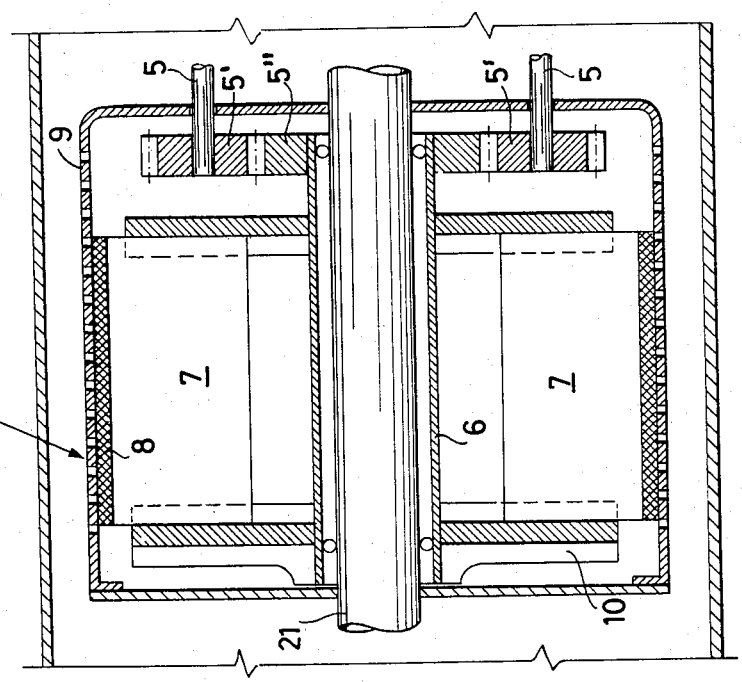

United States Patent [19]

Rognoni

[11] Patent Number: 4,494,584

[45] Date of Patent: Jan. 22, 1985

[54] DEVICE FOR FILLING A PIPE WITH FLUIDS, FOR EMPTYING FLUIDS FROM A PIPE AND FOR DRYING A PIPE

[76] Inventor: Antonio Rognoni, Via Faruffini, 11, Pavia, Italy

[21] Appl. No.: 445,741

[22] Filed: Nov. 30, 1982

[30] Foreign Application Priority Data

Dec. 2, 1981 [IT] Italy ................. 44017 A/81

[51] Int. Cl.³ ................................................. B65B 3/04
[52] U.S. Cl. ........................................ 141/98; 141/89;
141/392; 15/104.06 R; 34/104; 138/89
[58] Field of Search ............ 138/89, 90; 15/104.0 S,
15/104.06 R, 104.16, 104.17, 104.18, 104.19;
34/104; 141/98, 85-91, 37-66, 392

[56] References Cited

U.S. PATENT DOCUMENTS

| 3,525,111 | 8/1970 | Arx ................... | 15/104.06 R |
| 4,314,577 | 2/1982 | Brister ............... | 138/89 |
| 4,357,960 | 11/1982 | Han .................. | 138/89 |

*Primary Examiner*—Houston S. Bell, Jr.
*Attorney, Agent, or Firm*—Hedman, Gibson, Costigan & Hoare

[57] ABSTRACT

A device for emptying fluid from a pipe and for filling the pipe with another fluid while preventing the fluids from mixing comprising a sealing gasket attached to the head end of a tubular support member which presses against the inner wall of the pipe to maintain the separation of the fluids while also drying the inner wall, and a breaking unit attached to the support member for slowing the movement of the device within the pipe thereby slowing the velocity of the fluid filling the pipe.

8 Claims, 10 Drawing Figures

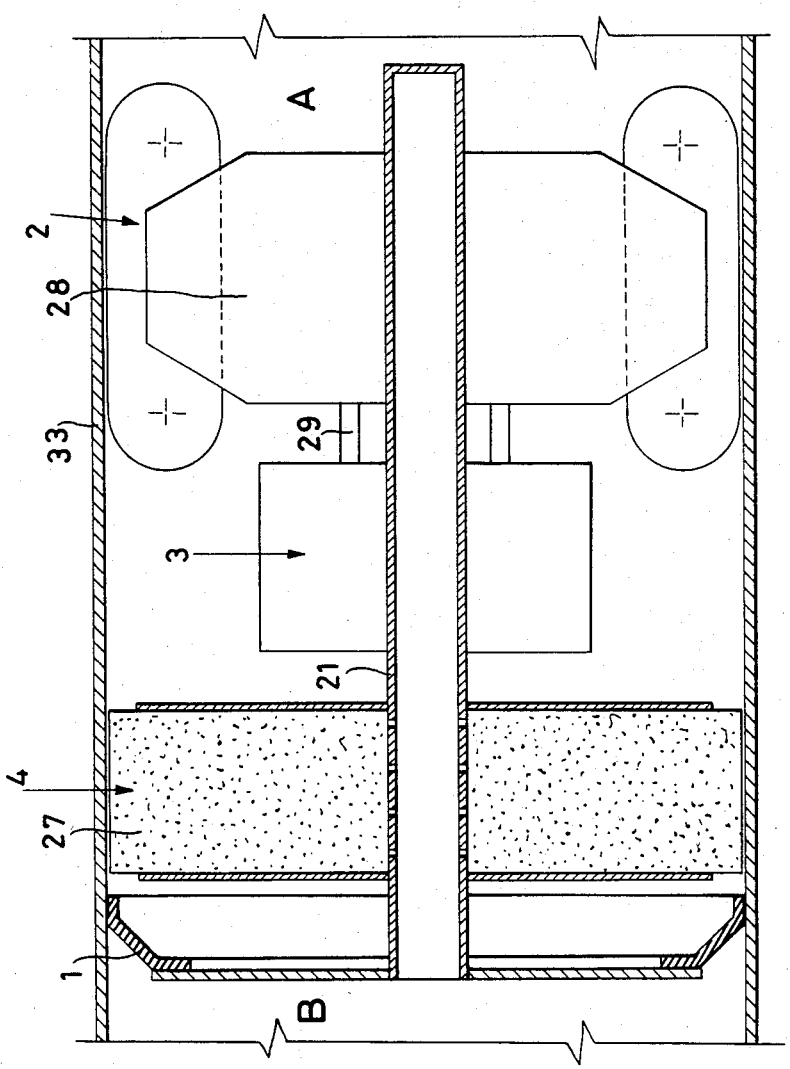
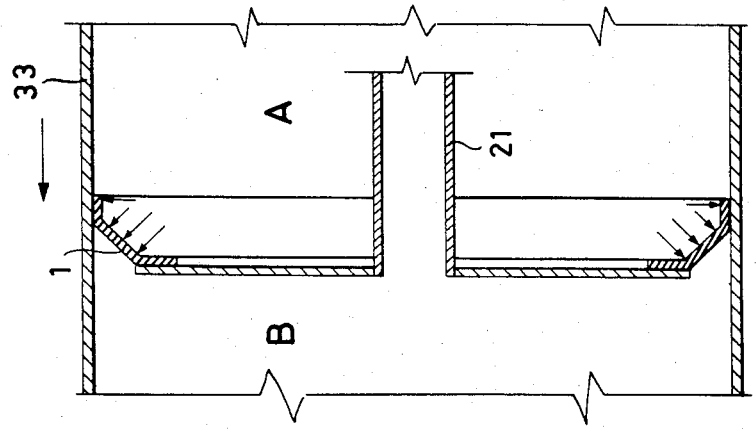

DEVICE FOR FILLING A PIPE WITH FLUIDS, FOR EMPTYING FLUIDS FROM A PIPE AND FOR DRYING A PIPE

Pipes are usually tested by filling them with water, and then pressurizing.

In carrying out this latter operation, it is very important to prevent air from entering the pipe.

This is because besides altering the pressure/volume relationship of the pressurizing water, air leads to a greater energy accumulation inside the pipe, and considerably increases the risk of the pipe bursting.

On conclusion of the test, all the water contained in the pipe must be carefully evacuated in order to prevent the remaining water from transferring an unacceptable moisture content to the conveyed fluid.

The drying operation is normally carried out in various ways after emptying the pipe.

One such drying method consists of introducing a large quantity of methanol into the pipe and making the slug of methanol run along the entire length of the pipe.

Another method includes lowering the pressure inside the pipe by means of vacuum pumps or ejectors to a level sufficient to cause the residual water to boil.

Finally, different fluids occupying adjacent portions of pipe are sometimes conveyed by the same pipe during operation.

Generally, the different fluids are separated during movement by members which prevent them from mixing, in order to prevent the more valuable product from becoming derated.

This is normally done by inserting rubber or synthetic resin spheres into the pipe between one fluid and another.

It is an object of the present invention to prevent the formation of air pockets during the filling of a pipe with water or other fluids. It is another object of the present invention to prevent the filling fluid from assuming uncontrolled and dangerous velocities along the descending pipe portions.

It is a further object of the present invention to allow the contained fluid to be totally and controllably evacuated during emptying, while at the same time drying the pipe walls.

It is another object of the present invention to enable different fluids to be conveyed in the form of adjacent portions during the operation of a pipe, while preventing their mixing.

The device according to the present invention is illustrated diagrammatically in FIG. 1. The device 50 includes a seal gasket 1, sliding members 2, a braking unit 3, and a drying unit 4.

There is also provided a tubular supporting member 21, along with the centering members and the step-up gear 28 and the transfer members 29. The device is initially inserted into the end of the pipe 33 and is moved along by pumping fluid A behind it under pressure.

The sealing gasket 1 is mounted to the head portion 52 (see FIG. 9) which is attached to the tubular member 21. The drying unit 4 and braking unit 3 are also supported by the tubular member 21. Sliding member 2 engages the inner walls of the pipe 33 and is connected to the tubular member 21 and braking unit 3 by the step up gear 28 and transfer members 29.

The braking unit hinders the forward movement of the fluid but does not prevent it, and thus the pressure of fluid A assumes a value substantially greater than the pressure of fluid B.

This difference in pressure causes the seal gaskets 1 to be strongly pressed by fluid A against the pipe 33 walls and adheres to them perfectly. This therefore prevents the lack of uniformity always encountered along the walls (welds, changes of thickness etc.) from causing fluids A and B to mix (FIG. 2), resulting in the passage of fluid B upstream.

Furthermore, if the gaskets become damaged, with the consequent loss of sealing, it is always fluid A which moves forward of the device, to mix with fluid B, and never the opposite. This is of great importance in the filling and emptying operations of pipe 33. This is because by introducing the device at one end of the pipe and forcing it to move to the other end by pumping the filling fluid, or air in the case of an emptying operation, the evacuation of all the fluid contained in the pipe downstream of the device is ensured.

In addition, during the filling of pipe 33, the braking action of the device prevents the filling fluid from assuming excessive velocities in the descending pipe portions due to falling. This enables the entire operation to be kept under control, because the particular design of the braking unit described hereinafter enables a braking effect to be obtained which is greater the higher the velocity of the device.

The drying unit 4 is not essential for the proper operation of the device, because the adherence of the seal gaskets to the pipe (33) surface, caused by the pressure difference between fluid A and fluid B, normally ensures a sufficient degree of drying. However, the drying unit 4 can be useful when a high degree of drying is required. The purpose of this unit in such a case is to collect any final residues of fluid B, and to convey them by the action of the higher pressure of fluid A into that part of the pipe in front of the device.

This unit is not required when the device according to the invention is used as separation means in the simultaneous conveying of different fluids during operation.

More than one practical embodiment of the device according to the invention is possible, as described hereinafter:

(a) Sliding members.

Figure 5:
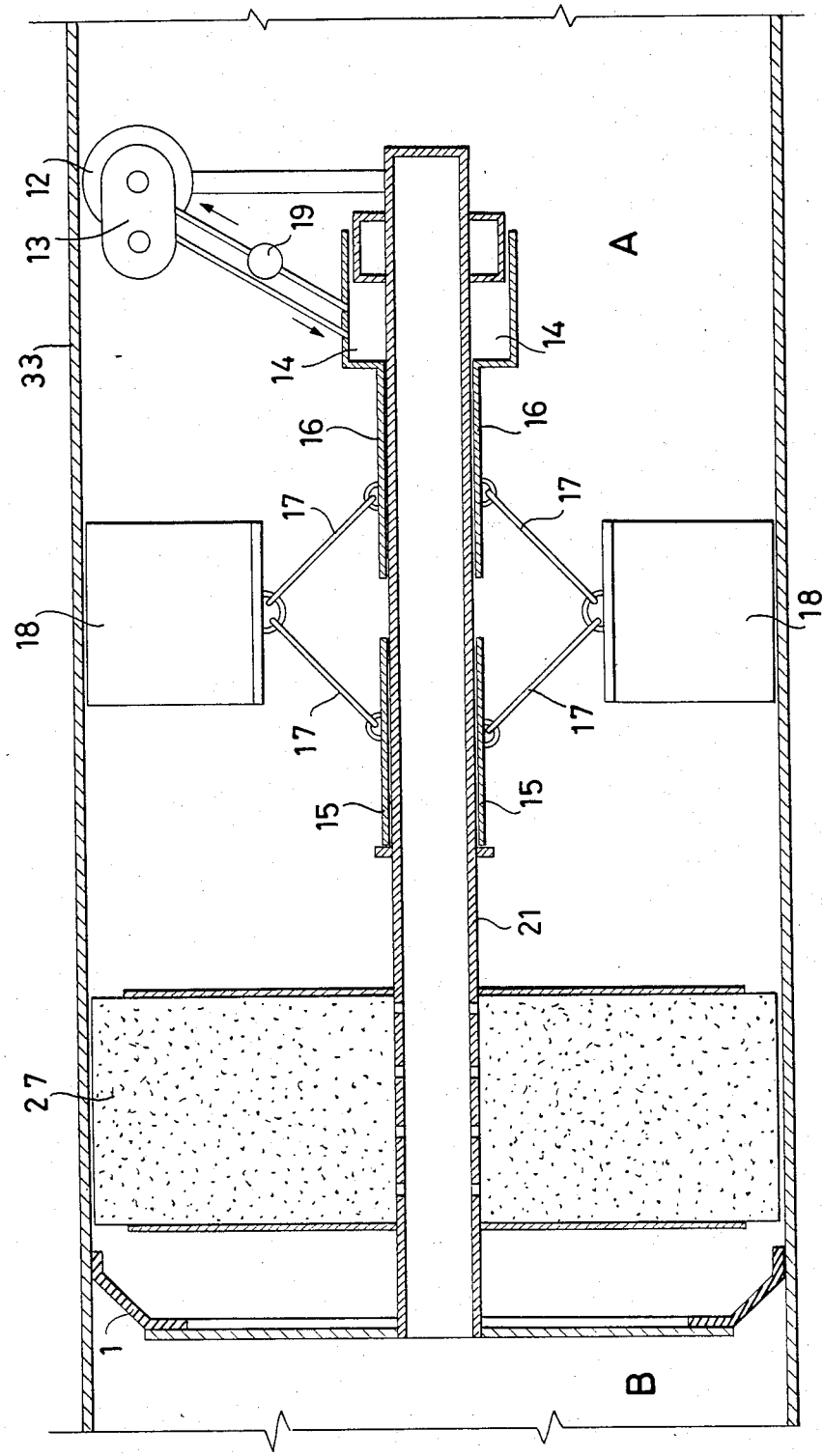

These can consist of wheels or crawler tracks in a minimum number of two, or alternatively can be in the form of shoes which slide on the inner surface of the pipe. In this case, the sliding and centering unit can also perform the braking function (FIG. 5).

(b) Seal members.

These are constituted by gaskets of rubber, synthetic resin or other flexible abrasion-resistant material.

(c) Braking unit.

Figure 4:
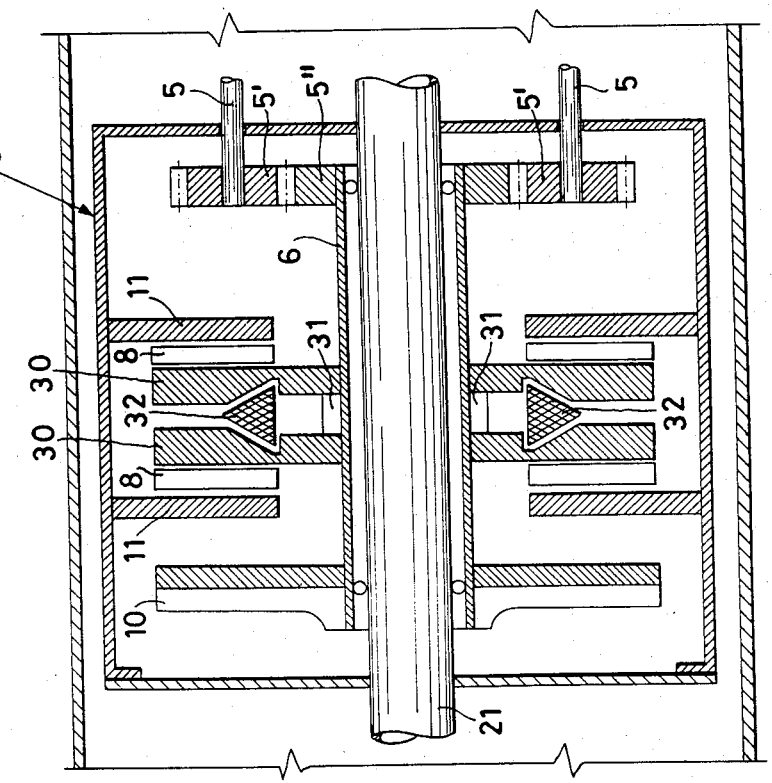
Figure 6:
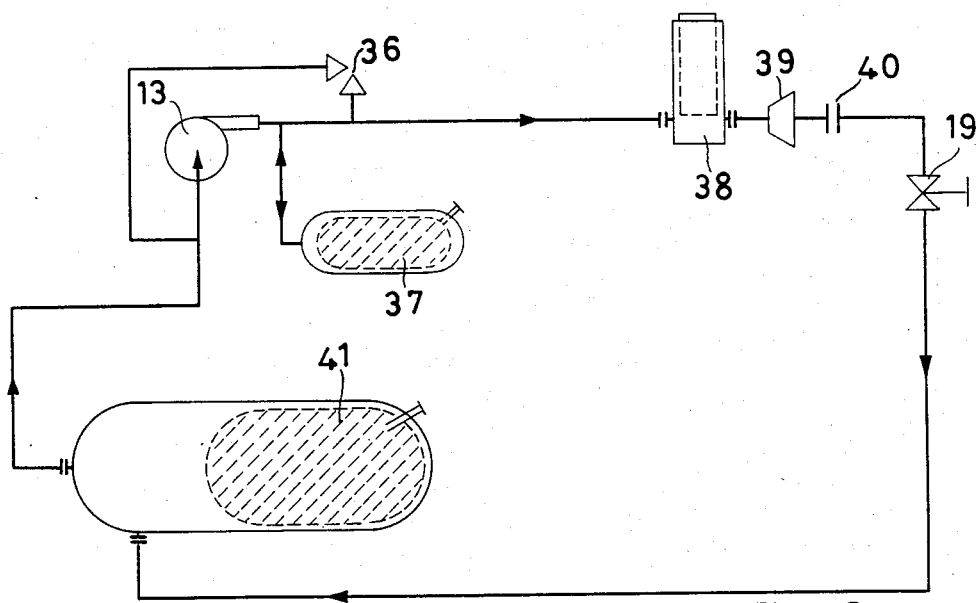

A possible embodiment is shown in FIG. 3. The rotation of the sliding members (wheels or crawler tracks) causes the shaft or shafts 5 to rotate by way of suitable gears in mesh with a gear 5″ integral with the hollow shaft 6. A step-up gear 28 can be inserted into the mechanism in order to increase the rotational speed of the hollow shaft 6, which operates the braking device 3. This latter is provided with suitable masses 7 which are mobile in a radial direction, and which when urged by centrifugal force cause the friction shoes 8 to slide on the drum 9. The fan 10 prevents overheating and contributes to the braking effect. Alternatively, the friction shoes 8 can operate by sliding on the fixed discs 11 (FIG. 4). On the rotary discs 30 integral with the hollow rotary shaft 6, there can be seen centrifugal masses 32. In this manner, a braking effect is obtained which is greater the higher the velocity of forward movement of the device inside the pipe 33. This makes the movement very uniform because any obstacle which would tend to reduce the velocity of forward movement of the device likewise reduces the efficiency of the braking unit, thus providing the thrust necessary for overcoming the obstacle. A second embodiment of the braking unit is shown in FIG. 5. The wheel 12 is rotated by the forward movement of the device in the pipe 33, and operates the pump 13 either directly or by way of a step-up gear. In this manner, the pressure of the fluid contained in the interspace 14 is raised, and the two concentric cylinders 15 and 16 approach each other. The levers 17 thus cause the friction shoes 18 to withdraw from each other and press against the pipe wall 33, thus braking the forward movement of the device. The efficiency of the braking unit can be adjusted as required, by suitably setting the pressure regulating valve 19. The diagram of the hydraulic circuit for this braking unit is shown in FIG. 6, in which 13 is the pump, 36 a safety valve, 37 an oil-air reservoir, 38 a jack, 39 a filter, 40 a rotary disc, 19 a micrometric valve, and 41 another oil-air reservoir.

Figure 7:
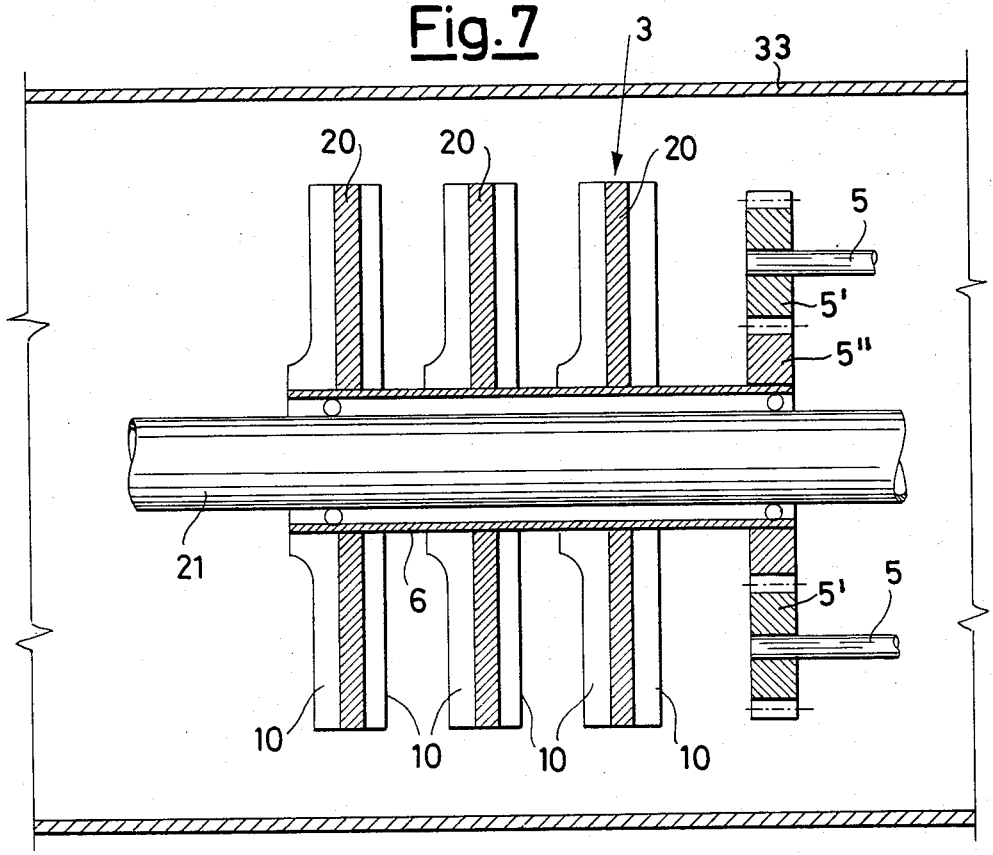

A final embodiment of the braking unit is shown in FIG. 7. In this case, the braking effect is obtained by one or more impellers 20 fitted with blades 10 and rotated in a manner similar to that already described for the braking unit 7 with centrifugal masses. The braking effect is generated by the action of the fluid on the impeller (20) blades (10).

(d) Drying unit.

This unit is not required if the device is used for filling the pipe 33 with water in order to prepare it for hydraulic testing, or when the device is used as a separate means between two different fluids during conveying. If however the device is used for evacuating the test water (after pressurization and depressurization) and a fairly high degree of drying is required, the drying unit 4 could be inserted into the device. The device comprising the drying unit can be used in a second operation with the pipe full of fluid A after the first operation in which the pipe is emptied of fluid B has been carried out with the device in which the drying unit is absent. Alternatively, the two devices can be inserted into a pipe a short distance apart during a single emptying operation. In both cases, the formation of pockets of fluid A downstream of the first device is prevented.

Four possible embodiments of this unit are described hereinafter. The first is illustrated in FIG. 1. The absorbent material 27 collects the liquid residues, and by virtue of the greater pressure of fluid A conveys them into the pipe portion in front of the device by way of the tubular device support 21 which in this case acts as a tube for conveying the liquid particles downstream.

Figure 8:
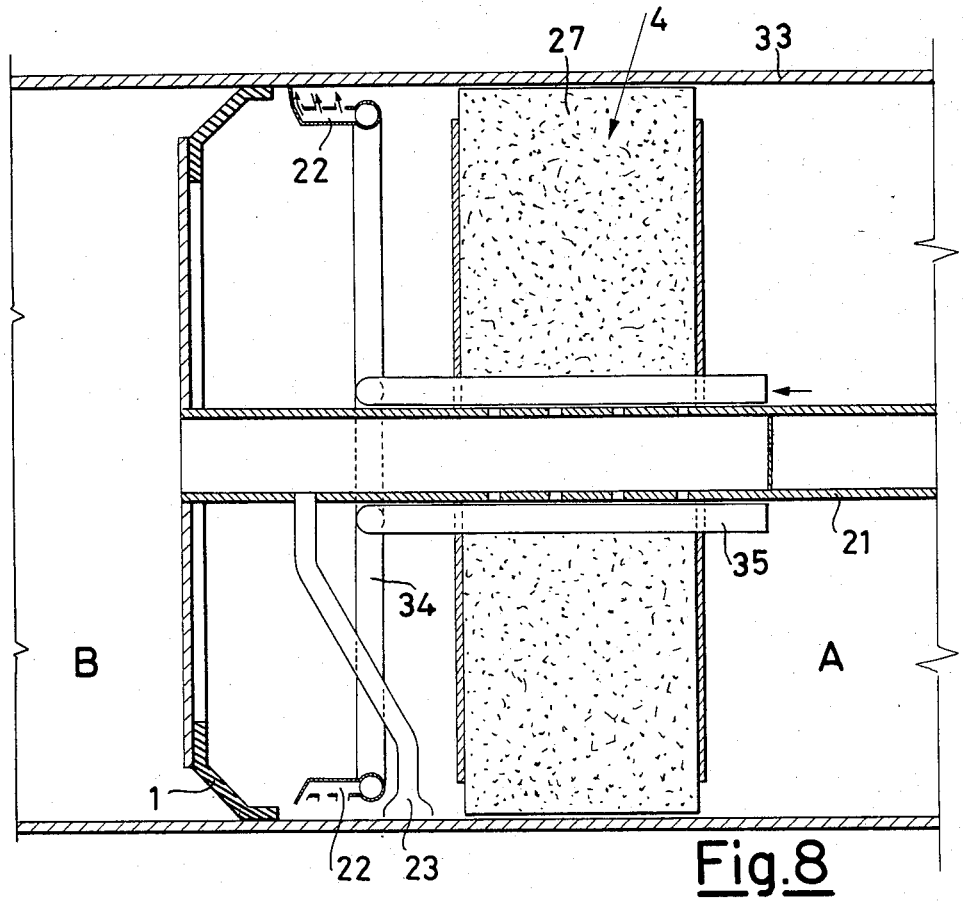
Figure 9:
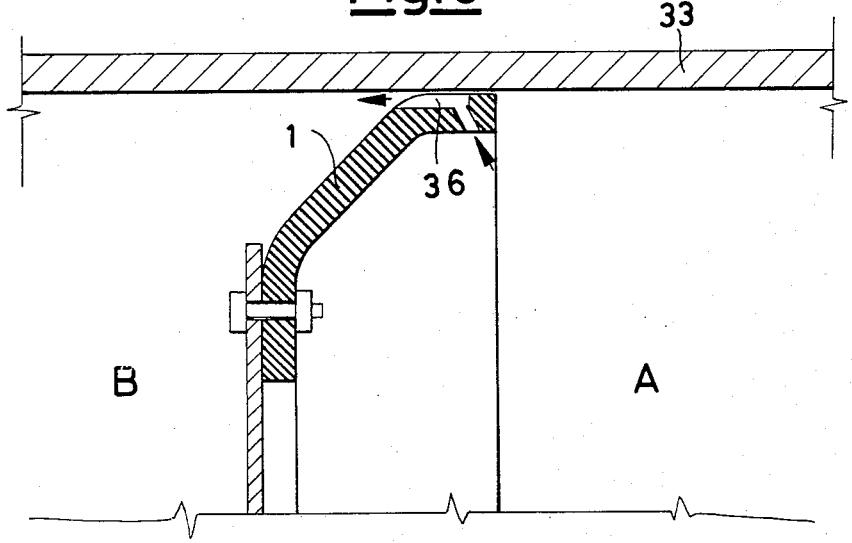

The second possible embodiment is shown in FIG. 8 and consists of a series of air jets 22 which cause any liquid which may have escaped past the seal gaskets to be collected in the bottom of the pipe 33, said jets being connected with the dispensing ring 34 and a manifold 35. The suction rose 23 conveys the fluid from this point to the front of the device by utilizing the greater pressure of fluid A. The third embodiment consists of conveying jets of fluid A on to the walls of the pipe 33 through suitably orientated slowing ducts 36 provided in the seal gasket 1. These jets act directly downstream of the device (FIG. 9).

Figure 10:
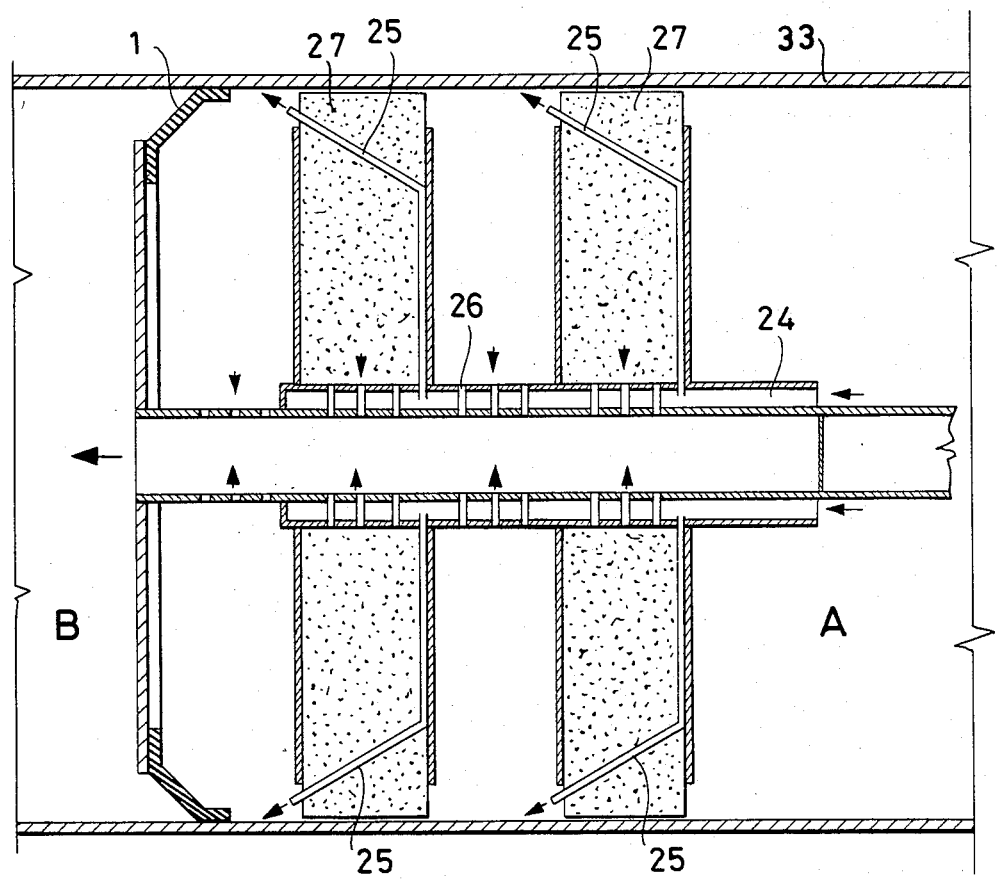

The fourth embodiment (FIG. 10) consists of conveying the fluid A through the feed tube 24 to the nozzles 25, which blow the fluid on to the pipe (33) wall. Any liquid particles which have accumulated on the wall are removed by the fluid in the form of a suspension, which is discharged downstream of the device through the discharge ducts 26. The drying material 27 completes the drying operation, and the fluid A which permeates through the pores of the material removes any particles which have collected therein, and discharges them through the discharge ducts downstream of the device.

I claim:

1. A device for emptying a fluid from a pipe and for simultaneously filling the pipe with another fluid while preventing the fluids from mixing, comprising:

a support member having a head end for insertion in the pipe for emptying a fluid from the pipe;

a sealing means attached to the head end of said support member so that when the device is inserted in the pipe the sealing means presses against the inner walls of the pipe thereby preventing the fluid being emptied from the pipe from mixing with the fluid filling the pipe, and a braking means attached to said support member for slowing the movement of the fluid filling the pipe thereby causing the pressure of the filling fluid to be greater than the pressure of the emptying fluid to produce a braking action that increases as the velocity of the filling fluid increases.

2. The device of claim 1, further including a sliding means contacting the inner walls of the pipe and a gear means connected between said sliding means and said braking means for driving said braking means.

3. The device of claim 1, further including a drying means attached to said support member adjacent and behind said head end thereof as the device is inserted into the pipe for the collection of any residual amounts of the fluid being emptied from the pipe.

4. The device of claim 1, wherein the braking means includes centrifugal masses which are rotatable about said support member and friction shoes in engagement with said centrifugal masses whereby rotation of said centrifugal masses urges said friction shoes in contact with the inner walls of the pipe, thereby slowing the movement of the device and slowing the velocity of the fluid filling the pipe.

5. The device of claim 2, wherein the sliding means includes a wheel which contacts the inner wall of the pipe and rotates by the forward movement of the device in the pipe and a pump connected to said wheel which is operative to move a pair of hydraulic concentric cylinders along said support member, and wherein said braking means includes a plurality of levers connected to said concentric cylinders and a pair of friction shoes connected to said levers such that movement of said concentric cylinders toward each other urges said friction shoes against the inner wall of the pipe thereby slowing the movement of the device and slowing the velocity of the fluid filling the pipe.

6. The device of claim 1, wherein the braking means includes a plurality of impellers rotatable about said support member whereby the rotation of said impellers acts against the flow of the fluid filling the pipe to slow the velocity of the filling fluid.

7. The device of claim 3, wherein the drying means includes one or more sections of absorbant material extending between said support member and the walls of the pipe.

8. The device of claim 3, wherein the drying means includes a series of air jets adjacent the inner wall of the pipe for collecting any residual amounts of the fluid to be emptied, and a suction means for transferring the residual fluid from the air jets to said head end of the device.

* * * * *